(12) United States Patent  
Rivera-Sanchez

(10) Patent No.: US 9,154,590 B2  
(45) Date of Patent: Oct. 6, 2015

(54) BUSINESS CARD WITH INCORPORATED RINGER

(76) Inventor: Antonio Rivera-Sanchez, Badajo (ES)

( * ) Notice: Subject to any disclaimer, the term of this patent is extended or adjusted under 35 U.S.C. 154(b) by 21 days.

(21) Appl. No.: 14/118,610

(22) PCT Filed: Apr. 19, 2012

(86) PCT No.: PCT/ES2012/000095  
§ 371 (c)(1),  
(2), (4) Date: Nov. 19, 2013

(87) PCT Pub. No.: WO2012/160220  
PCT Pub. Date: Nov. 29, 2012

(65) Prior Publication Data  
US 2014/0087787 A1    Mar. 27, 2014

(30) Foreign Application Priority Data

May 20, 2011   (ES) ................................ 201100560 U

(51) Int. Cl.
| | | |
|---|---|---|
| *H04B 1/38* | (2015.01) | |
| *H04M 1/02* | (2006.01) | |
| *H04M 1/275* | (2006.01) | |
| *H04M 1/725* | (2006.01) | |

(52) U.S. Cl.  
CPC ............ *H04M 1/0202* (2013.01); *H04M 1/275* (2013.01); *H04M 1/72541* (2013.01); *H04M 1/72588* (2013.01)

(58) Field of Classification Search  
CPC ............. H04M 1/0287; H04M 17/005; H04B 1/3833; H04W 88/02  
USPC ......................... 455/90.3, 550.1, 575.1, 556.1  
See application file for complete search history.

(56) References Cited

U.S. PATENT DOCUMENTS

| | | | | |
|---|---|---|---|---|
| 5,875,393 | A * | 2/1999 | Altschul et al. ................ | 455/407 |
| 5,965,848 | A * | 10/1999 | Altschul et al. ................ | 174/254 |
| D455,139 | S * | 4/2002 | Roberts ..................... | D14/138 R |
| 7,058,365 | B2 * | 6/2006 | Kugler .......................... | 455/90.3 |
| 2010/0318727 | A1 * | 12/2010 | Lee et al. ...................... | 711/103 |

* cited by examiner

*Primary Examiner* — Sonny Trinh  
(74) *Attorney, Agent, or Firm* — Hoglund & Pamias, PSC; Roberto J. Rios

(57) ABSTRACT

Business card with incorporated ringer formed by a mobile phone module, a strong memory module and optionally a multimedia presentation module in which the device is off by default and is only activated by pressing a bottom (5 or 6) in order to make a telephone call to a predetermined telephone number according to the time and day. The components of the three modules are distributed in an upper area where they are soldered to a FLEX cable (23) an intermediate area for battery and a lower area formed by a multiplayer base plate (26) to which the components thereof are soldered. The card has a thickness of between 2 and 4.5 mm and the functional elements thereof are placed on the sides of said card, with the exception of the screen which is installed in a FACE.

9 Claims, 4 Drawing Sheets

Figure 1
Figure 2
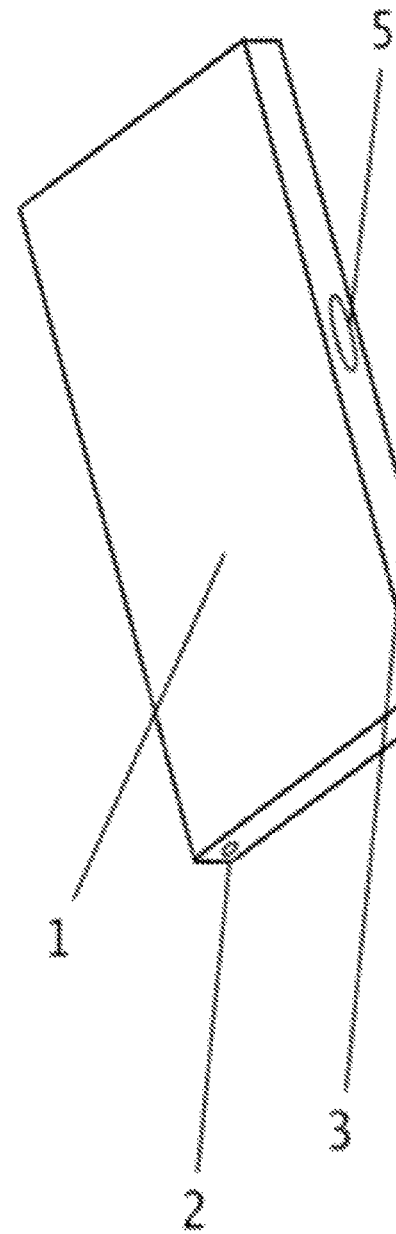
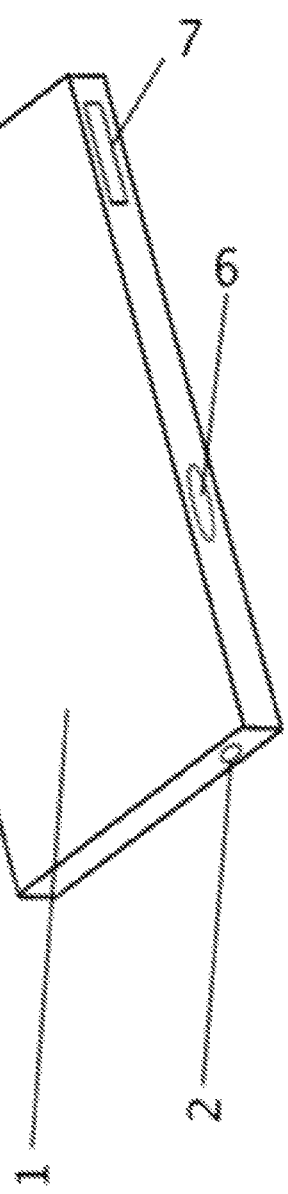

BUSINESS CARD WITH INCORPORATED RINGER

FIELD OF THE INVENTION

The present invention relates to a business card with an integrated mobile phone, which includes a mobile phone module, a date storage module and an optional multimedia presentation module. Therefore, this invention falls within not only within the business card sector, but also within the field of electronic communication devices which includes various uses such as mobile telephony, data storage and multimedia presentation.

In addition, the present invention has the application of being used as a portable device that enables a person to connect to a particular party by pressing a single button, and the invention falls within the sector of personal telecommunications.

BACKGROUND OF THE INVENTION

Documents known in the state of the art related to the present invention are Spanish patents ES2143307 and WO01/60631A1. Spanish Patent ES2143307 protects a thin integrated circuit card containing an improved manually operated switch. Despite including a manually operated switch, this patent does not meet the objective aimed at in the present invention consisting of a device of a size equivalent to that of a business card which includes the elements needed to make telephone calls restricted to a phone number that is present depending on the day and time. That is, it only allows the cardholder to make calls to the phone number preset based on the time and day of the week. Moreover, document WO01/60631A1 shows a greeting or business card that allows a certain number of calls to be made to one single phone number. In this case, this document does not show specific elements that make up the proposed invention, which makes it impossible to discover the technique used to achieve the objective pursued. In addition, document WO01/60631A1 also includes a retail sales schema that is not covered by the protection.

SUMMARY OF THE INVENTION

The present invention is a device designed to facilitate immediate contact between a potential customer and the business sales organization without the client having to look for the information or make multiple contacts with interlocutors until he contacts the seller. As an added bonus, this device allows the seller to present himself to the client with a modern and advanced corporate image, and gives preferential treatment by providing a means of immediate contact.

The device consists of a business-card-sized package, that is, less than 100×60 mm and between 2 and 4.5 mm thick. One side of the business card has a traditional format while the other side includes an optional LCD colour display with a minimum resolution of 320×240 dots per inch and a minimum of 64,000 colours. The accessories required for card operation are installed along the perimeter of the card. Including the accessories on the card's perimeter makes the surface intended to provide the seller's information as large as possible for both the traditional print presentation as well as in graphics mode through videos, presentations, etc.

The elements that comprise the device are distributed in three different physical areas—upper, middle and lower— that, together, enable the three functions that are the subject of the present invention. It should be noted that each zone does not correspond to a function. These functions correspond to the following functional modules:

1 Mobile telephony functional module
2 Mass memory storage functional module
3 Multimedia presentation functional module The thickness of the card depends on the number of functional modules integrated into it, so that the thickness will reach 4 mm if the modules for the three functions above are included, but if only the elements enabling the phone and memory functions are included, the thickness of this device is between 2 and 2.5 mm.

These three functional modules are developed as follows:

1. Mobile telephony module. The function of this module is pre-programmed to—in combination with the day of the week and the time—place a seller-paid phone call to the telephone number designated to serve these clients at that particular time. The mobile telephony built in to the device is usually turned completely off, thereby optimizing battery life and not generating any type of radio emissions. With this solution, battery life without recharging exceeds one year as the self-discharge process is low, since for a lithium-ion battery the discharge occurs gradually at a rate of lower than 6% per month and, thus, after six months at rest they can retain 80% of their charge. Furthermore, the fact that it is turned off by default helps to overcome the client's misgivings about the nuisance of potential unsolicited calls, unsolicited messages, etc. With just the touch of a single button, the device is activated and establishes communication based on the date and time parameters with the interlocutor preset by the seller. Once the communication has finished and after a preset time period between two and ten seconds has passed, the device returns to its resting state, i.e., completely off. This programming is done by the seller and protected by security algorithm software (password) to prevent tampering and ensure that it fulfils the proper functions for the seller.

2. NAND Flash non-volatile mass memory storage module. This portable memory is accessible by the client for his personal use Thus, the business card gives the client an alternative use that is of value to him, causing its use as a portable memory to expand the seller's target audience Memory access is done via a universal serial bus connector known as a retractable USB via a connector that allows it to be connected to any computer with a USB port This port has the dual function—known in the state of the art—of allowing the battery to be charged and accessing the FLASH portable memory built into this card The design of this retractable USB connector is determined by the need to achieve the minimum possible thickness for the device, since any other type of port causes an increase in the device's thickness Therefore, the connector profile is not that of a standard male type A USB connector, but of a design with a smaller bottom part, which is what connects to the USB port. This connector is normally retracted into the device body and extracted by means of a locking lever located on one side or edge of the card.

3. Multimedia presentation module. This module functions with the help of a light-emitting diode graphical display, better-known by its acronym LCD (light-emitting diode) in colour, with a minimum resolution of 320×240 dots per inch and a minimum of 64,000 colours occupying the whole of one side of the device, and an internal membrane speaker with a very low profile. The speaker is soldered directly to the FLEX cable and the display is connected via a male-female connector socket which is also soldered to the FLEX that links the upper area to the lower area. The loudspeaker used in this module is the same one used in the mobile telephony function. All that is required to display videos, corporate presentations and graphics is pressing a second button specific for this function. Once the presentation is finished, it turns off automatically returning to standby. The stored presentation is done by the seller and stored in the non-volatile memory, protected by security algorithm software (password) to prevent tampering and ensure that it fulfils the proper functions for the seller. The electronics for operating this function—i.e., an mpeg4 integrated circuit decoder and a NAND FLASH non-volatile storage memory for storing video and audio for reproducing the presentation chosen by the seller—are located in the lower area.

This module is optional and its absence allows for the device to be less thick and lower in weight, as well as of a lower manufacturing cost.

The mobile telephony function is the priority of among the three discussed above, so that activating the telephone function causes the other functions which were in operation to be deactivated. The location of the button that activates the mobile phone has been done so that it will be impossible to press it if the device is connected to a computer, since the device cannot be used for talking if connected to a computer. However, if the device is connected to a USB-type power supply unit, it can be pressed and, thus, this function can be activated.

The above functions are done with the help of the different elements, including the card, which are located inside the card housing in the three areas where the components of all the functions are mixed together:

Upper area. It consists of a socket for inserting micro-SIM cards with the PIN code disabled. However, in countries or operators that do not work in GSM mode, if operating in CDMA mode, there would be no socket. There are also a polyphonic speaker membrane, a button battery for keeping the date and time, a socket connector for an LCD display and a retractable USB connector installed. This USB connector includes a manually retractable mechanism, operated by a lever protruding from one side of the device so that it can be connected to a computer or electrical supply device. The micro SIM card socket, speaker, RTC battery and display connector are soldered to a FLEX cable whose other end is soldered to a connector in such a fashion that the male part of the connector is soldered directly to the motherboard and the female part is soldered to the FLEX where the components from the top part are soldered. The four USB connector pins slide directly on four electrical tracks on the FLEX cord.

Middle area. The 3.7 volt DC lithium-ion battery with a storage capacity of at least 500 milliamp/hour powering the electronics that allows the operation of mobile phone features and multimedia presentation is located here. This type of battery is widely known in the state of the art. The mass storage memory requires no internal power supply, since this function is powered through the computer's USB port to which this device must be connected in order to use the mass storage function and which, in turn, charges the battery through a load control circuit located in the lower area. As stated, the normal state of the device is "off", so battery life is increased without a need for recharging. The battery is connected directly to the bottom area, where the recharging is done, controlled by the temperature reached by the battery and the battery is used. The three pins of the battery—positive, negative and temperature—are soldered directly, pin-to-pin, to the lower area's motherboard.

Lower area. The motherboard with the electronics for controlling, loading and operating the device is located here, as well as a button on each side to operate the mobile telephony and multimedia presentation modules. Two LEDs also located on the side serve to indicate the operating status of the mobile telephony module and the battery charge. It also includes an antenna for telephone communications. This antenna is located in the lower area in order to distance it as much as possible from the sensitive areas of the human body.

The components in the lower area are soldered directly using the "surface mounted device" system (SMD) and the method of lattice-grid ball soldering—BGA (Ball Grid Array)—on a multilayer base plate on only one of their sides. The reason for using this technique is to achieve the least possible thickness.

This device has another application which is based on being able to locate relatives and friends of anyone who may find himself in a defenceless situation at a given moment. These people can include small children, people with disabilities, the elderly, sick, injured, etc. It is extremely useful for all these people to carry (in a pocket, wallet, handbag, or around the neck) a device like the one mentioned above which includes the modules that enable mobile phone functions as well as the memory function. For these people, this device offers the technical advantage that both the person carrying it as well as anyone else can make the call and communicate with the predetermined person by pressing a single button, something that is not possible with other communication devices such as mobile phones. Furthermore, this device does not emit radio frequency emissions that may interfere with precision medical devices that may be worn by users, since it is turned off by default and put into operation only when activated by pressing the button described above. Therefore, in addition to avoid radiation that could be harmful for these users, this device has the advantage of extending the life of the battery without any need for recharging, and is accessible so that anyone providing help to these people can—without the slightest difficulty—locate the people responsible for them. Should the modules for the multimedia presentation function be added, it would offer the utility of storing a video which explains the specific care, diseases and medications that the person carrying the device may need.

BRIEF DESCRIPTION OF THE INVENTION

The following drawings representing a model embodying the present invention are included for a better understanding of this descriptive report.

FIGS. 1 to 3 show different perspective views of the outside of the card.

DETAILED DESCRIPTION OF THE INVENTION

Figure 3:
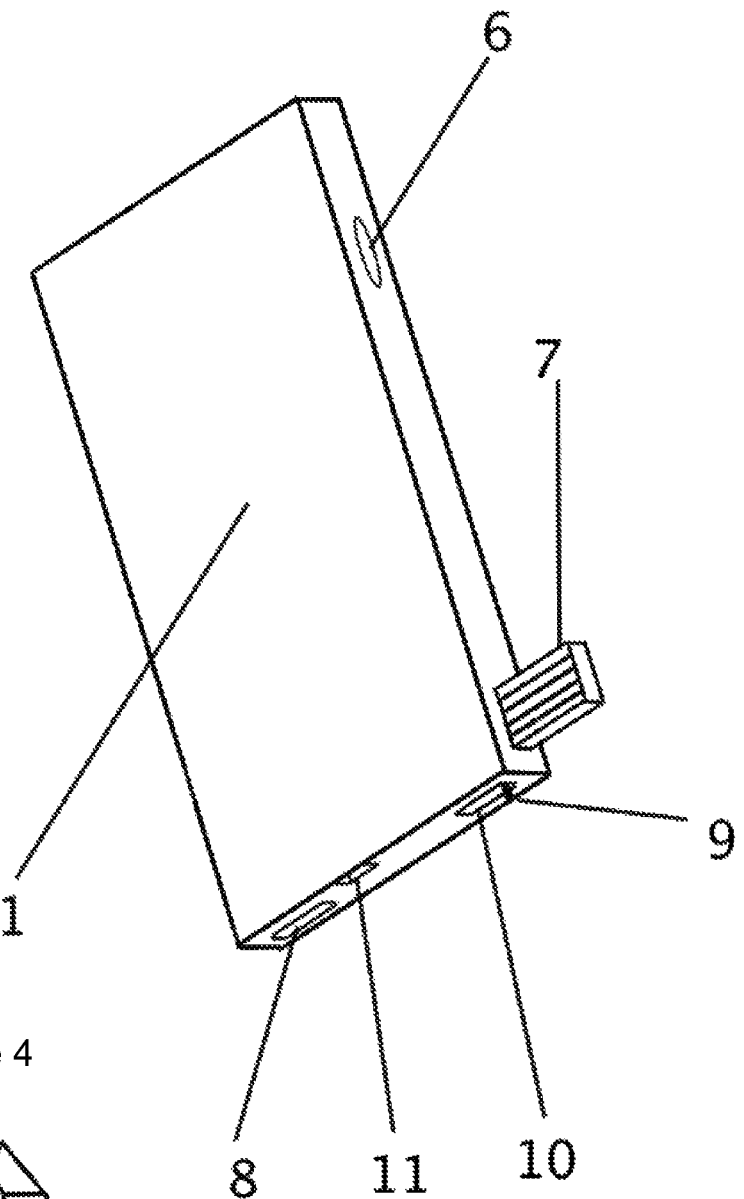

FIGS. 1 and 2 show one side of the card, which includes an LCD colour graphic display (1) with a resolution of at least 320×240 dots per inch, which enables user-specific presentations to be shown, whether for commercial use or for personal use for people with disabilities or illnesses. In all cases, the information displayed on this screen has been previously stored. An opening is made in the card's lower short side, where the reception of the microphone (2) which allows the user to communicate with the client or predefined interlocutor is located. The card's long left side includes two LEDs (3,4). When the LED (3) lights up, it indicates to the user that the telephone module is operating correctly, while when the other LED light (4) lights up, it indicates to the user that this device's battery (20) is correctly charged. The button (5) on this same side allows the multimedia presentation shown on the display (1) to be activated when pressed. On the opposite long side, the button (6) that activates mobile telephone function is shown, as well as the opening made on the side that allows the input and output of the USB connector (7). This USB port (7) is shown displayed in FIG. 3 together with the lever (9) which serves to extract the port (7) when we move it through the orifice (10) made in the other short side. An opening is made in this side for the speaker (11) and another opening that allows the inclusion of a socket (8) for receiving the card known as "micro SIM".

The opposite side, not shown in these figures, could include another LCD display or simply have the information requested by the customer written on it, such as that generally included on business cards. In the case a business card is being imitated, this side could be made of card or paper to allow writing by a pen or pencil. For this, the card would include a face that would adhere to the structure of the card or this may be done through a specific closure between the structure of the card and the card.

Figure 4:
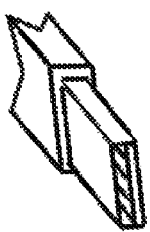
FIG. 4 shows a type A USB connector.
Figure 6:
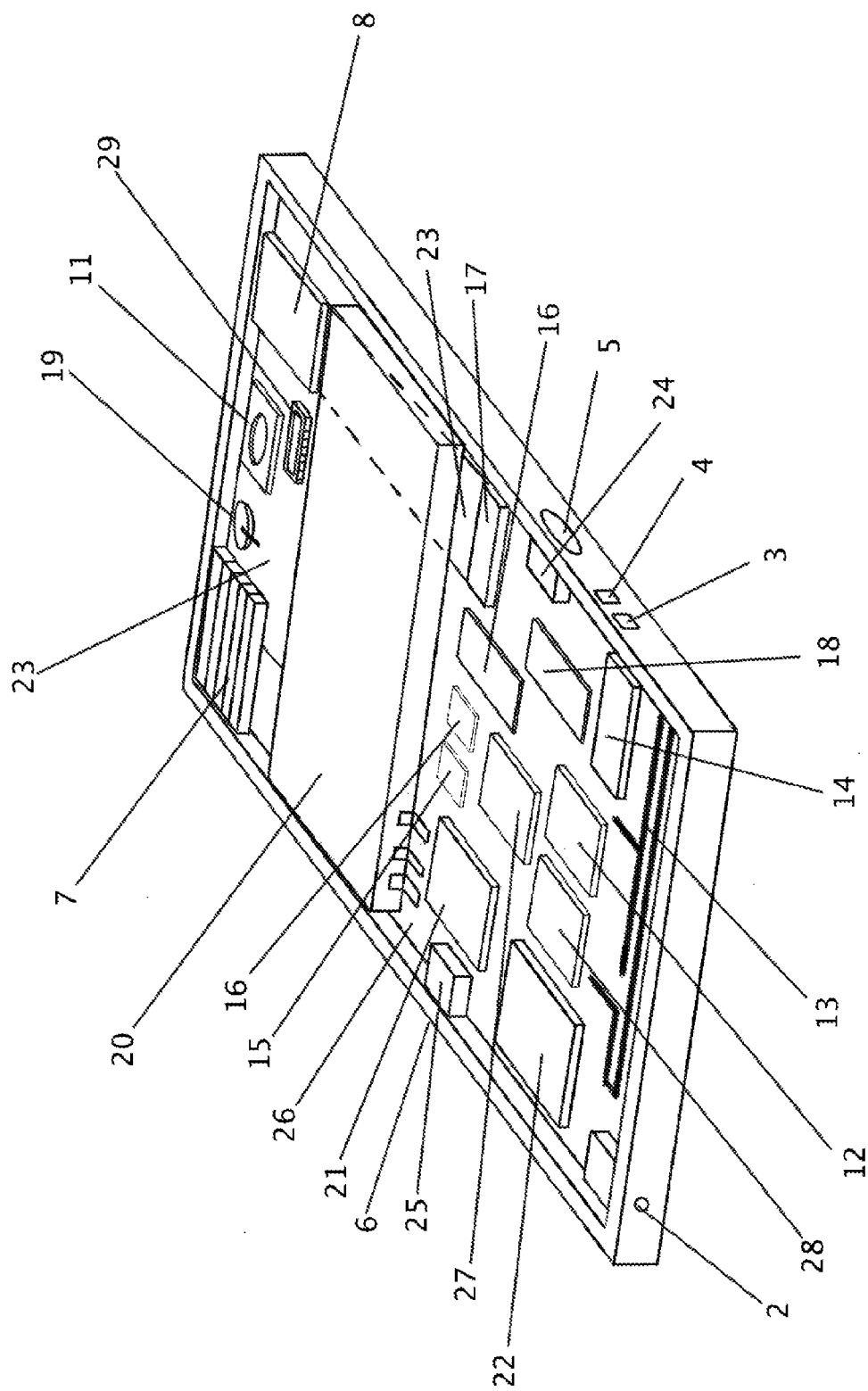
FIG. 6 shows the components included by the inside of the card.
Figure 7:
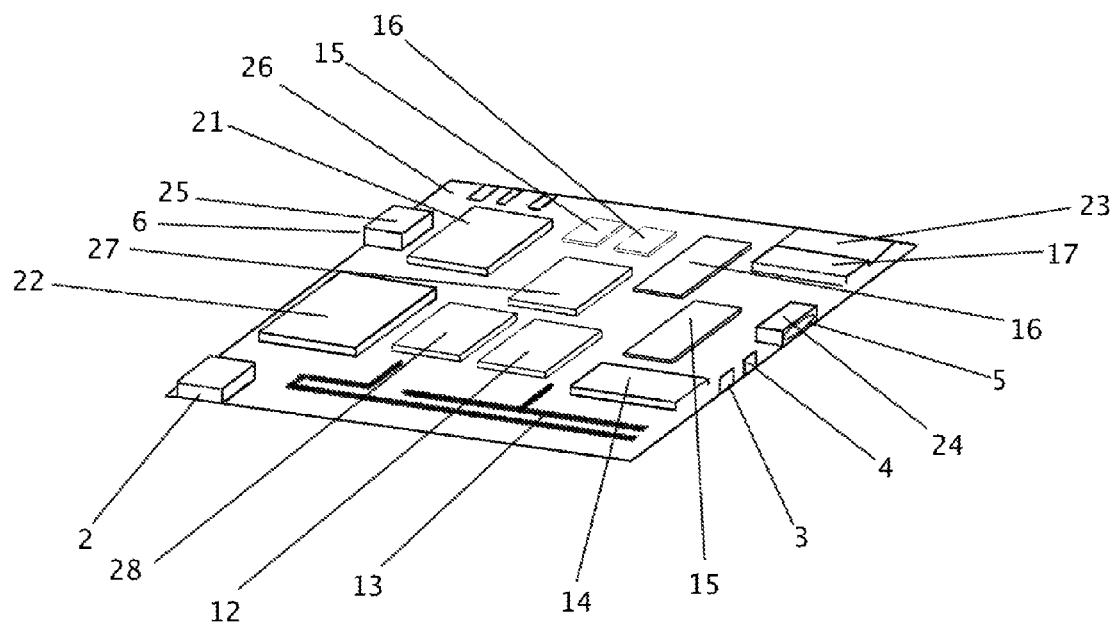
FIG. 7 shows the components of the motherboard and lower area in detail.

FIGS. 6 and 7 shows the electronics for the control, charging and operation of the device. The electronic components are soldered to it by SMD and BGA one only one of its sides to a multilayer motherboard (26). Among the components that are soldered by said methods to the motherboard (26) are the following major components:

In relation to mobile phone module, it can be seen in FIG. 4 that pressing the button (6) activates the power microswitch (25) in order to proceed to activate this device's mobile telephony module. Until the button (6) is pressed, standby, the microswitch (25) leaves its internal circuit in the open position and the signal for the battery (20) to power the mobile telephone components through the motherboard (26) is not generated. When the button (6) is pressed, the microswitch (25) closes the two poles of its internal circuitry via an internal conductive plate—not shown in the figures—of the microswitch (25) thereby causing the closure of the electric circuit on the motherboard (26) corresponding to the telephone module and causing the power supply and signal to reach the other elements making up the mobile phone module through the circuit board (26). That is, when the button (6) is pressed, the microswitch (25) closes the electrical circuit mobile telephony module, with the signal reaching the microprocessor (22) which manages the signal and activates a phone call to the number previously defined based on the time and day, and previously stored in the memory (28) for use by the owner. Using a spring inside the microswitch (25)—not shown in the figures—it returns to its open circuit position when the button (6) is no longer being pressed, but the motherboard circuit remains closed allowing telephone communication a few seconds after the interlocutor hangs up, at which time a new signal disconnects the supply of power from the battery. That is, it is not necessary to hold the button (6) down during the call. Thus, the user will be freed of this task so that he can carry out other tasks such as taking notes during the conversation. This type of micro switch (25) is commonly used in electronic systems and is known as a "mechanical pulse microswitch".

The button (6) for activating the call is located on the same side as the retractable USB (7), thus preventing calls from being made when this device is connected via the USB (7).

An antenna (13) facilitates the transmission and reception of telephone communications. The antenna (13) used will be suitable for the radio frequency operating band in each country. It consists of an electric track printed on a thin layer of plastic base support and is soldered directly to the motherboard of the device (26).

A microprocessor (22) is implements all the functions and controls all components so that if one of the buttons (5, 6) is pressed, it will receive the corresponding electrical signal and activate the multimedia presentation or telephone module. Similarly, in case the USB port (7) connects with another compatible device, it will enable and manage the storage and deletion of data in the memory (27). The microprocessor (22) includes the audio/video decoder whose function is to transform the microprocessor commands (22) into electrical signals suitable for the operation of the speaker and the display. Currently, a Qualcomm MSM6500 microprocessor can be used.

Memories (27, 28), comprising two separate integrated units. The reason for using two memories it is for security. One memory (27) is devoted exclusively to the user, for mass storage, and the other memory (28) contains the device's operating system and the information programmed by the owner (mobile telephone and multimedia presentations). The memory (27) for the user is NAND FLASH with a capacity of at least 1 GB. The memory (28) for telephone and multimedia NAND FLASH plus M-SDRAM and are examples of these memories of at least 1 GB of NAND FLASH capacity and 256 MB of M-SDRAM capacity.

Integrated energy management (21) unit, whose function is to control all aspects of the device's power supply. It provides power from the battery (20) for operating the device, controls said battery charge and manages power to the display (1) and to all the electronic components. This element is widely known in the state of the art as the "QUALCOMM PM6650 chip".

Socket (8) receptor for a micro SIM mobile telephone card. This socket (8) is soldered to a FLEX cable (23) connected to the motherboard (26) by a connector (17) so that the male connector part (17) is soldered directly to the motherboard (26) and the female part is soldered directly to the FLEX (23). The FLEX cable (23) joins the upper to the lower areas.

Radiofrequency circuits (12, 14, 15, 16 and 18) also soldered using BGA to the multilayer motherboard using BGA (26), which are responsible for managing all the radio signals necessary to make mobile phone calls via its communication with the base antennas of each operator. This type of circuit is known in the state of the art and is used. Examples of these circuits are QUALCOMM RFR6000, SKYWORKS SKY77329, EPCOS D5006, QUALCOMM RTR6300PM6650, QUALCOMM RFL6000.

Membrane microphone (2) for transforming the speakers voice into electrical signals useful for digital processing by the digital audio/video decoder for transmission over the mobile telephone network.

The speaker (11) is shown is polyphonic with a piezoelectric membrane.

Button battery (19) which serves to keep the date and time.

Regarding the multimedia presentation module, a microswitch (24) similar or equal to the microswitch (25) will be used. When the button (5) is pressed, the microswitch (24) proceeds to close its internal circuit via a conductive plate, not shown in the figures. When the button (5) is pressed, the microswitch (24) closes the multimedia presentation module circuit, with the signal reaching the microprocessor (22) which manages the signal activating the display (1) and the presentation previously stored in the memory (28). Using a spring inside the microswitch (24)—not shown in the figures—it returns to its open circuit position when the button (5) is no longer pressed, opening the circuit. After the preset time has passed, the display turns off automatically. The display (1) is connected to the motherboard (26) through a male-female connector (29) soldered to the FLEX (23) which connects the upper to the lower areas. The male part of the connector is soldered to the display and the female part to the FLEX (23).

Some of the elements have already been discussed above, such as the LEDs (3 and 4) which, when lit up, indicate the state of the telephone module to the user along with the battery charging process (20) which stores and provides power for operating the elements installed in this device. Thus, when the button (6) is pressed, the LED (3) starts flashing to indicate that the device is establishing communication with the interlocutor. Once the communication is established, the LED (3) light is steady after flashing quickly and turns off to return to the device's standby. In addition, when the battery (20) is very close to running out, the LED (4) flashes quickly. When the battery (20) is charging, this LED (4) flashes slowly and if it is fully charged, it is steady. If there is an attempt to activate the phone or multimedia presentation and battery (20) is not sufficiently charged, the LED (4) flashes quickly informing the user of the status of the battery charge.

Figure 8:
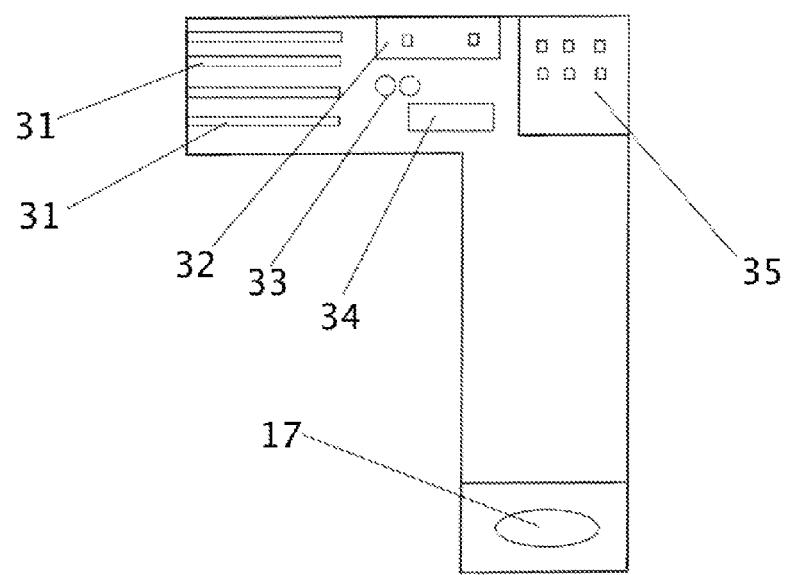
FIG. 8 shows a FLEX cable like the one used in the present invention.

FIG. 8 shows the different elements of the FLEX cable (23); it shows the four tracks (31) on which the USB connector (7) slides with the help of sliding runners (36), the soldering (32) of the speaker (11), the soldering (33) of the RTC battery (19), the soldering (34) of the connector (29) for the display (1), the six points (35) for soldering the socket (8) for the micro SIM card and at the bottom part of the FLEX cable (23), the connector (17) for connecting the FLEX cable (23) to the motherboard (26).

Figure 5:
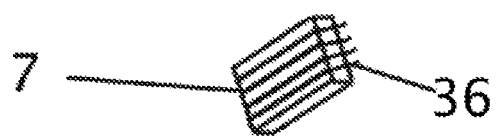
FIG. 5 shows the port or USB connector used in this device.

The USB port or connector (7) used in this invention is shown in FIG. 5) in comparison to the type A USB connector shown in FIG. 4). The USB port (7) of this invention is the same as the type A but without the metal frame surrounding it. In the case of the USB port (7), the four pins (30) have to be uncovered in order for them to slide over the four printed tracks (31) on the FLEX (23). To do this, the pins make use of runners (36).

LIST OF ITEMS SHOWN IN THE FIGURES

1. Device screen
2. Microphone
3. LED
4. LED
5. Multimedia presentation button
6. Mobile telephony button
7. Retractable USB port
8. Socket for the micro SIM card
9. Lever
10. Orifice for the displacement of the lever
11. Speaker
12. Radio frequency circuit
13. Antenna
14. Radio frequency circuit
15. Radio frequency circuit
16. Radio frequency circuit
17. FLEX connector
18. Radio frequency circuit
19. Button battery
20. Battery
21. Integrated power management unit
22. Microprocessor
23. FLEX cable
24. Microswitch for button 5
25. Microswitch for button 6
26. Motherboard
27. Memory allocated for user
28. Protected memory
29. Display to FLEX cable connector
30. USB port pins
31. FLEX printed tracks for the USB connection (7)
32. Speaker soldering
33. Two solderings for the RTC battery
34. Soldering for the display connector
35. Six points of connection for the SIM socket (8)
36. USB port runners (7)

This invention is for industrial application in the business card technical sector and for portable electronic devices in order to carry and transfer information as well as for communications.

The invention claimed is:

1. A Business card with built-in mobile telephone, comprising a mobile telephone module and a memory storage module, characterized because the mobile telephony module comprises:
    a speaker;
    a microprocessor;
    an integrated power management unit;
    at least one radiofrequency circuit;
    a microphone;
    a battery; and
    a button to activate a telephone call to a predetermined number stored in said storage memory module; wherein the card is equipped with a certain thickness, and includes an opening for a USB connector on one side or edge of the card, and comprises an orifice for displacing a lever with locking for the extraction of the USB connector.

2. The Business card with built-in mobile telephone of claim 1, wherein said memory module comprises a first NAND FLASH memory, intended for the user of the business card, and a second NAND FLASH plus M-SDRAM memory, programmed with the data relating to said phone number recipient of said telephone call.

3. The Business card with a built-in mobile telephone of claim 1, wherein the USB connector is of the removable without housing type and its four pins, including runners sliding on the metal tracks of a FLEX bus cable.

4. The Business card with a built-in mobile telephone of claim 1, wherein one side of the card is writable paper or card.

5. The Business card with a built-in mobile telephone of claim 4, wherein it is equipped with a multimedia presentation module comprising:
    an LCD display located on the upper side of the card; and a mechanical button microswitch with an internal spring that generates a signal located on the long opposite side which includes the opening for the USB port and the button,
with microprocessor having an audio/video decoder.

6. The Business card with a built-in mobile telephone of claim 5, wherein the display is connected to the motherboard through a male-female connector soldered to the FLEX cable.

7. The Business card with a built-in mobile telephone of claim 6, wherein it comprises three areas:
an upper area that houses the USB connector, the speaker, a button battery and socket for micro SIM cards, with these elements soldered to the surface of the FLEX cable;
a middle area, which includes the battery; and
a lower area formed by a multilayer motherboard to which the battery, microprocessor, power management unit, radio frequency circuitry and microphone are attached.

8. The Business card with a built-in mobile telephone of claim 7, wherein said soldering is performed by using at least one of: SMD soldering and BGA soldering.

9. The Business card with a built-in mobile telephone of claim 1, wherein both sides of the card are writable paper or card.

* * * * *